No. 695,769. Patented Mar. 18, 1902.
J. TURNBULL.
CLUTCH.
(Application filed July 24, 1901.)
(No Model.) 2 Sheets—Sheet 1.
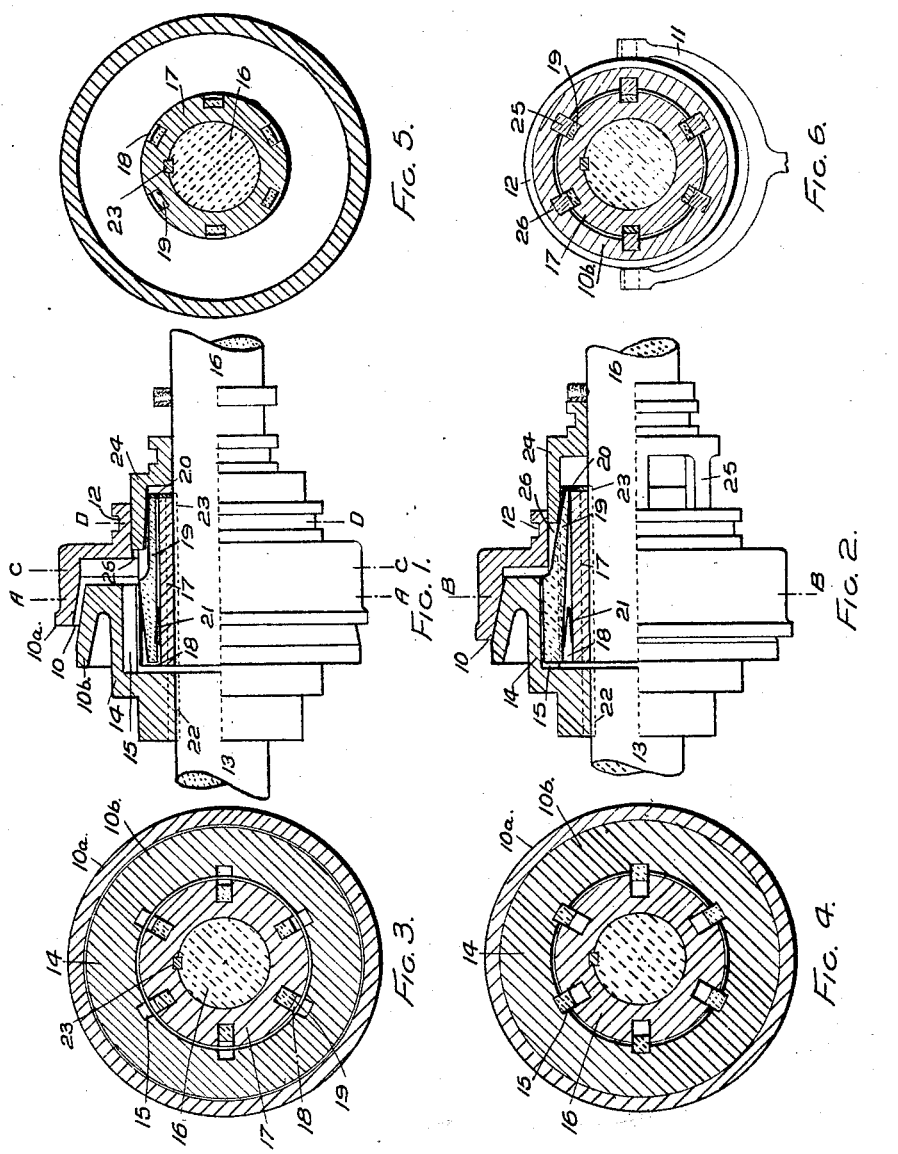
Witnesses:
Paul Schuster
A. H. Davis
Inventor
John Turnbull
By
Attorneys No. 695,769. Patented Mar. 18, 1902.
J. TURNBULL.
CLUTCH.
(Application filed July 24, 1901.)
(No Model.) 2 Sheets—Sheet 2.
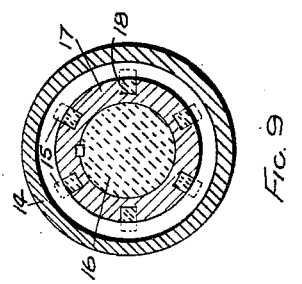
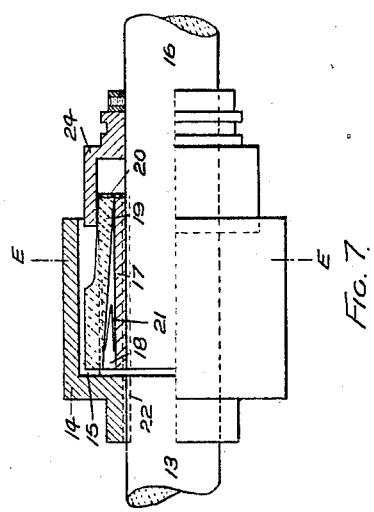
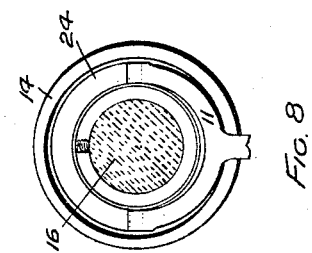
Witnesses:
Inventor
John Turnbull
By
Attorneys

UNITED STATES PATENT OFFICE.

JOHN TURNBULL, OF DUNDEE, SCOTLAND.

CLUTCH.

SPECIFICATION forming part of Letters Patent No. 695,769, dated March 18, 1902.

Application filed July 24, 1901. Serial No. 69,475. (No model.)

*To all whom it may concern:*

Be it known that I, JOHN TURNBULL, a subject of the King of Great Britain, residing at Butter's Loan, Lochee, in the city of Dundee and in the county of Forfar, Scotland, have invented a certain new and useful Improvement in Clutches, (for which I have made application for a patent in Great Britain, No. 12,474, bearing date June 19, 1901,) of which the following is a specification.

My invention has reference to improvements in or relating to clutches for coupling shafting and the like, the object being to render such couplings more positive and efficient in action and to simplify and facilitate the operations of engaging and disengaging.

In order that my said invention may be the better understood, I have hereunto appended two explanatory sheets of drawings, in the several figures of which the same reference-numerals are employed to denote the same or like parts where shown.

Figure 1 of these drawings is a side or longitudinal elevation, having its upper half in section at the central vertical plane to show the internal construction of my improved clutch and the relative disposition of the parts when wholly disengaged. Fig. 2 is a precisely similar view, but with the whole of the parts drawn as in the wholly-engaged position. Figs. 3 and 4 represent a cross-section at A A and B B of the clutch in the engaged and disengaged positions, respectively. Fig. 5 is a cross-section at C C, and Fig. 6 a cross-section at D D. Fig. 7 is a view corresponding to Figs. 1 and 2, but illustrating the use of the positive elements of my clutch only. Fig. 8 is an end view of the same; and Fig. 9 is a cross-section at E E, Fig. 7.

In carrying my said invention into effect or practice according to one modification and as illustrated in Sheet 1 of the annexed drawings I combine in one mechanism the necessary elements of a positive or interlocking clutch with those of a friction-clutch and that in such a manner as to secure in the combination the effective or mechanically valuable qualities of each. Externally such a combination may resemble and, in fact, consist of an ordinary friction-clutch 10 of the known hollow cone or similar type engaged or disengaged by the sliding of one of the cone-frustums $10^a$ on a feather or key by a lever 11 and yoke carried in the groove 12. Within or incased by such friction-clutch 10 the positive or interlocking parts are disposed as follows: On the end of one of the shafts 13 to be coupled and preferably for simplicity of construction forming part of the friction-cone $10^b$ I provide a hollow cup or cylinder 14, having its periphery notched or slotted at frequent and preferably regular intervals 15. On the end of the opposing shaft 16 I provide a boss or head 17, which will just fit inside the aforesaid hollow cup or cylinder 14 and containing in recesses 18 in its periphery a series of arms or fingers 19, corresponding in number and form with the before-mentioned slots 15. Such arms or fingers 19 are pivoted or hinged at 20 in their containing head or boss in such a manner that on their inner or free ends being forced outward by a spring 21 or like device they rise on such pivots, so that these ends pass into the slots 15 of the outer cup or sleeve 14, substantially as shown more particularly by Figs. 2 and 4, and so positively connect or couple the shafts 13 and 16 to secure their rotation together and to which they or their attachments are separately keyed at 22 and 23, respectively.

Attached to or suitably connected with the before-mentioned sliding element $10^a$ of the friction-clutch 10 I provide a ring or hollow cylinder 24, which while loosely embracing the fingers 19 when in their engaged position, as shown in Fig. 2, will when slid or forced along their outside depress them until they leave the slots 15, and so effect disengagement, as shown in Fig. 1.

In the drawings I have shown how the attachment or connection of this sliding ring with the sliding element of the friction-clutch may be suitably and simply effected by slotting or dividing the ring into arms 25, engaging and free to slide in grooves 26 in the boss of the cone $10^b$.

The action of the complete mechanism is as follows: When it is desired to either engage or disengage the finger and slot or actual positive driving portion of the clutch, the friction-clutch 10 is first engaged, so as to take upon it the transmission of the driving load or power, whereupon the ring or sleeve 24, embracing the fingers 19, is advanced or with-drawn to cause or permit of their withdrawal from or entrance to the slots 15 without shock to the mechanism or undue exertion on the part of the operator. I thus secure the advantages of friction engagement or disengagement with those of a positive or non-slipping drive, such as a friction-clutch cannot be relied upon to afford.

In a second modification applicable to shafting coupled or uncoupled when not rotating, and illustrated by Figs. 7, 8, and 9, I dispense with the friction elements 10ª and employ only my finger-and-slot positive clutch described.

Having now described my invention, what I claim as new, and desire to secure by Letters Patent, is—

1. A clutch, comprising an outer member provided with recesses on its inner peripheral surface, an inner member fitting in the outer member and provided with spring-pressed fingers engaging the recesses of the outer member, and means for disengaging the fingers from the said recesses, as set forth.

2. A clutch, comprising an outer member provided with recesses on its inner peripheral surface, a recessed inner member fitting in the outer member and provided with pivoted and spring-pressed fingers in the recesses thereof and engaging the recesses of the said outer member, and means for disengaging the fingers from the recesses of the outer member, as set forth.

3. A clutch, comprising an outer member provided with recesses on its inner peripheral surface, an inner member fitting in the outer member and provided with spring-pressed fingers engaging the recesses of the said outer member, and a sliding member embracing the fingers of the inner member, as and for the purpose set forth.

4. A clutch, comprising two cones sliding one upon the other, one of the cones being chambered and provided with grooves in the peripheral wall thereof, a head fitting in the chamber of the cone and provided with spring-pressed fingers engaging the grooves of said chamber, and means for disengaging the fingers from the recesses, as set forth.

5. A clutch, comprising two cones sliding one upon the other, one of the cones being chambered and provided with grooves in the peripheral wall thereof, a head fitting in the chamber of the cone and provided with spring-pressed fingers engaging the grooves of the said chamber, and a sliding ring embracing the fingers of the said head, as set forth.

6. A clutch, comprising two cones fitted to slide one upon the other, one of the cones being chambered and provided with grooves in the peripheral wall thereof, a head fitting in the chamber of the cone and provided with pivoted and spring-pressed fingers engaging the said grooves, and a ring carried by the sliding cone and embracing the fingers of the head, as set forth.

In witness whereof I have hereunto set my hand in the presence of two witnesses.

JOHN TURNBULL.

Witnesses:
 ROBT. GIBSON,
 ALLAN BAXTER.